G. J. SAYER.
MEAT GUIDE FOR SLICING MACHINES.
APPLICATION FILED JULY 11, 1914.
1,138,692.
Patented May 11, 1915.
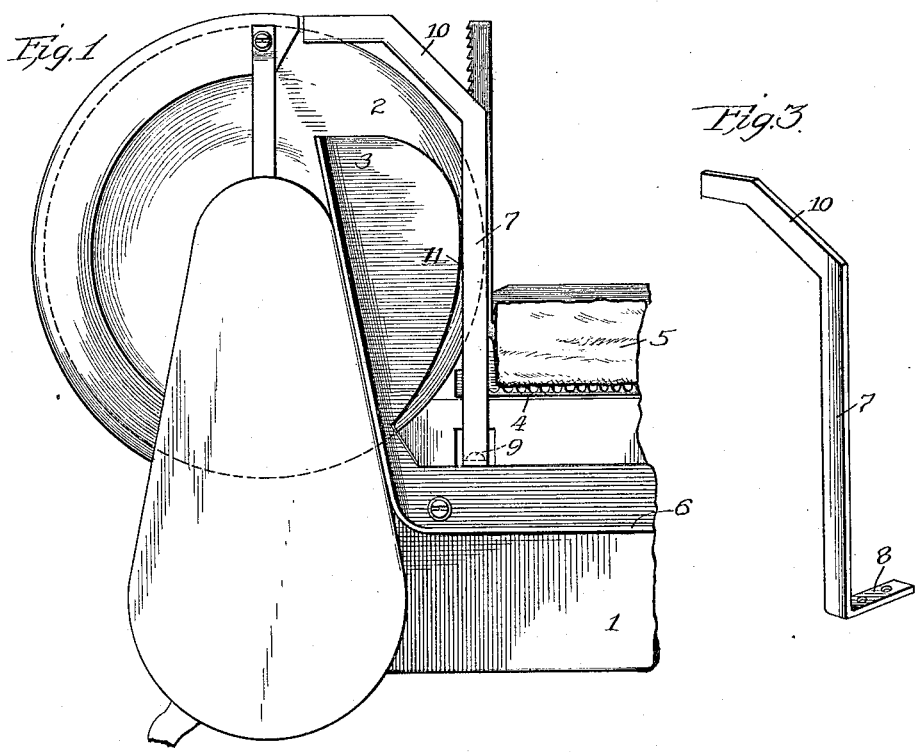
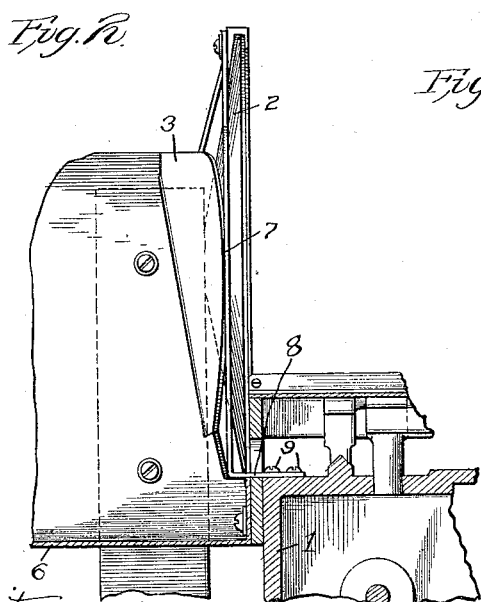
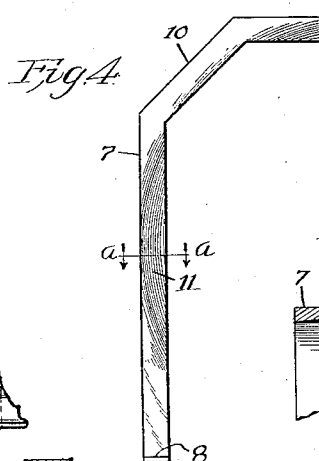
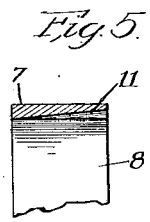
Inventor
George J. Sayer
Attorney

UNITED STATES PATENT OFFICE.

GEORGE J. SAYER, OF CHICAGO, ILLINOIS.

MEAT-GUIDE FOR SLICING-MACHINES.

1,138,692.  Specification of Letters Patent.  Patented May 11, 1915.

Application filed July 11, 1914. Serial No. 850,461.

*To all whom it may concern:*

Be it known that I, GEORGE J. SAYER, a citizen of the United States, residing at Chicago, in the county of Cook and State of Illinois, have invented a certain new and useful Improvement in Meat-Guides for Slicing-Machines, of which the following is a full, clear, concise, and exact description, reference being had to the accompanying drawings, forming a part of this specification.

My invention relates to meat guides for meat slicing machines and more particularly to that class of slicing machines having rotary circular knives, and has for its object the provision of a device adapted to guide the cut slice and in a measure to cause it to maintain its condition so that it will not crumble in falling to the table after being severed.

An important function performed by the use of the guides disclosed in this application consists in preventing the cut slices of meat from being thrown violently away from the knife if the machine happens to be operated at a great rate of speed. When the machine is operated at a high rate of speed the tendency is to throw the cut slices violently away from the knife and these cut slices under those conditions frequently land on the floor, clearing the meat table altogether. My improved guide prevents this objectionable feature in addition to permitting the other functions above enumerated.

I will describe my invention more in detail by referring to the accompanying drawing illustrating the same in which—

Figure 1 is a fragmentary view of a slicing machine having my improved guide in position; Fig. 2 is a transverse sectional view thereof illustrating my improved guide in position; Fig. 3 is a perspective view of the guide as removed; Fig. 4 is a side view thereof, and Fig. 5 is a sectional view on line *a—a* of Fig. 4.

Referring more particularly to Figs. 1 and 2, I show a slicing machine having a bed plate 1 upon which is suitably mounted a rotatable circular slicing knife 2 as is customary. A guide 3 is provided which separates the severed slice from the knife. A table 4 carries the meat 5 to be sliced. A plate 6 receives the severed slice, all as customary in slicing machines of this character. When slices of meat however are cut by the knife it frequently happens that the slices either crumble or at least do not maintain their shape when they are being guided by the guide 3 away from the knife. To cause the slices to maintain their shape so that they can be either more readily served or more readily packed, I provide a guide 7 which as shown more clearly in Fig. 3 has an angular extension 8 by which it is fastened to the base plate 1 of the machine by the screws 9. This guide is bent at its upper extremity as shown at 10 to more properly guide a slice when this slice is of a great width. The inner end of the guide as shown more clearly at 11 is beveled so as to tend to direct the meat slice away from the knife.

It will thus be seen that the meat slice is guided between the elements 7 and 3 and thus there is a greater tendency for the slice to retain its shape without crinkling or crumbling.

From what has been described the nature of my invention will be clear as will also its various applications. Having however thus described one form which my invention may take, what I claim as new and desire to secure by Letters Patent is:

1. A meat slicing machine having a rotary circular knife, a meat guide alongside of said knife to direct the severed slice away from said knife, and a second guide for said slice between which second guide and said first guide said slice passes as it is being severed by the knife, said second guide having a flat surface adjacent the knife and projecting beyond the cutting edge thereof toward the axis of the knife to form a support for the severed slice.

2. A meat slicing machine having a rotary circular knife, a meat guide alongside of said knife to direct the severed slice away from said knife, and a second guide for said slice between which second guide and said first guide said slice passes as it is being severed by the knife, said second guide consisting of a plate mounted vertically to said slicing machine, said second guide having a flat surface adjacent the knife and projecting beyond the cutting edge thereof toward the axis of the knife to form a support for the severed slice.

3. A meat slicing machine having a rotary circular knife, a meat guide alongside of said knife to direct the severed slice away from said knife, and a second guide for said slice between which second guide and said first guide said slice passes as it is being severed by the knife, said second guide having a flat surface adjacent the knife and projecting beyond the cutting edge thereof toward the axis of the knife to form a support for the severed slice, said second guide consisting of a plate mounted vertically to said slicing machine, and having its inner face beveled, so that its inner face presents a surface parallel to the surface of the knife and at the side thereof.

In witness whereof, I hereunto subscribe my name this seventh day of July A. D., 1914.

GEORGE J. SAYER.

Witnesses:
 WM. A. CHAPIN,
 JOHN M. PETERSON.

Copies of this patent may be obtained for five cents each, by addressing the "Commissioner of Patents, Washington, D. C."